Jan. 5, 1926.  1,568,358
G. I. WELSH
DIFFERENTIAL DRIVE MECHANISM
Filed Dec. 4, 1924  2 Sheets-Sheet 1
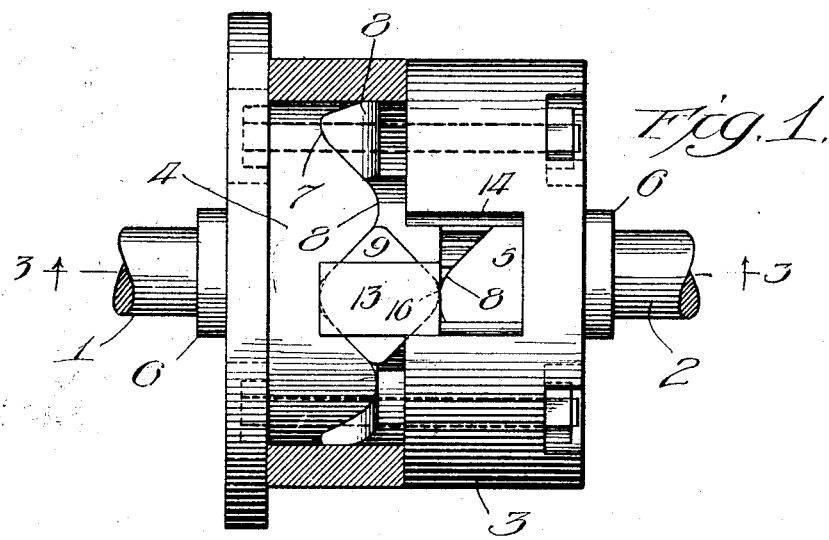
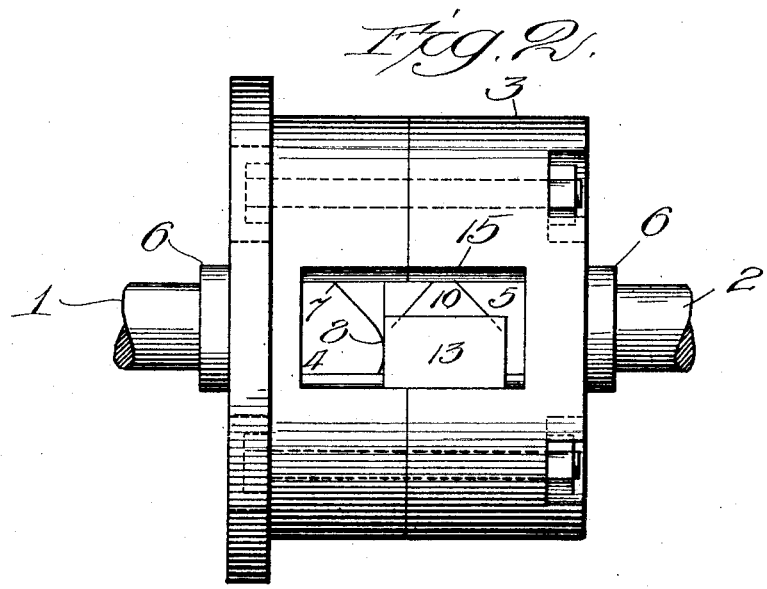
Inventor:
George I. Welsh,
By Wm. F. Freudenreich,
atty Jan. 5, 1926.                                                1,568,358
G. I. WELSH
DIFFERENTIAL DRIVE MECHANISM
Filed Dec. 4, 1924          2 Sheets-Sheet 2
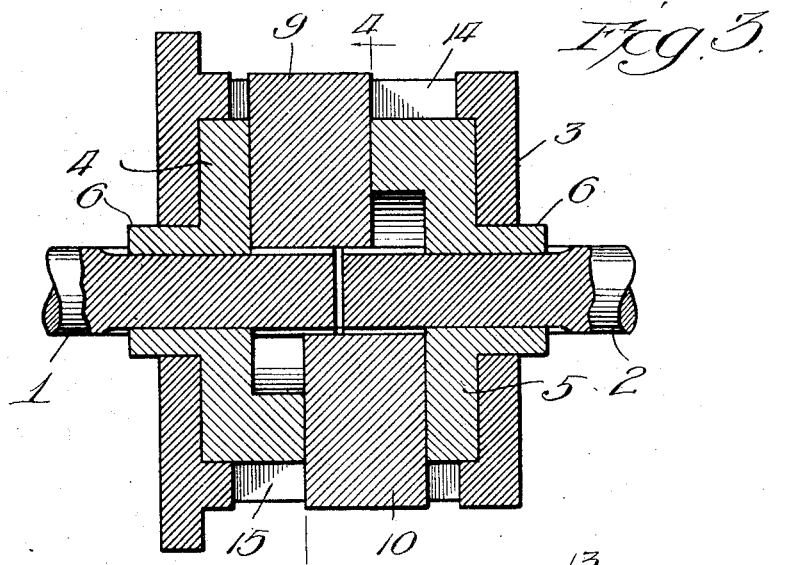
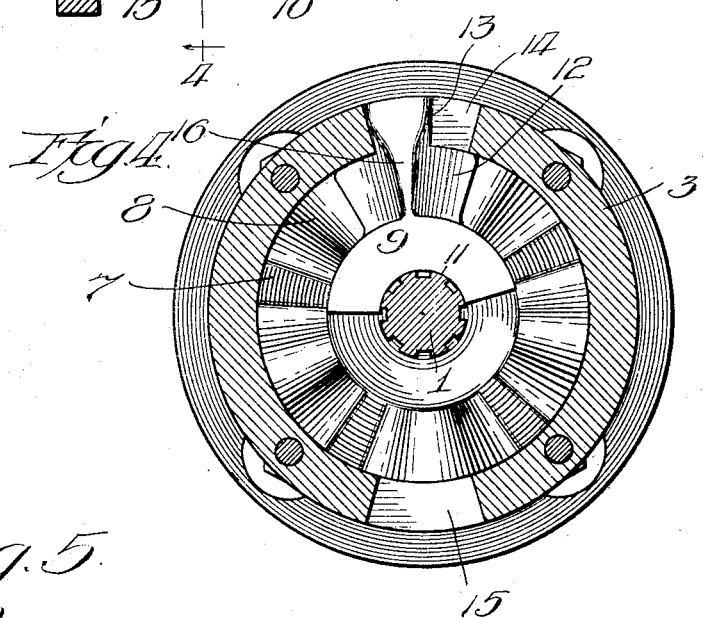
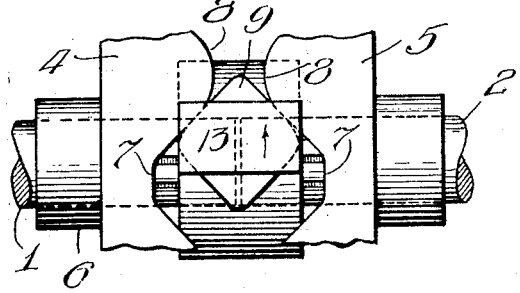

Patented Jan. 5, 1926.

1,568,358

UNITED STATES PATENT OFFICE.

GEORGE I. WELSH, OF DIXON, ILLINOIS.

DIFFERENTIAL DRIVE MECHANISM.

Application filed December 4, 1924. Serial No. 753,929.

*To all whom it may concern:*

Be it known that I, GEORGE I. WELSH, a citizen of the United States, residing in Dixon, county of Lee, State of Illinois, have invented a certain new and useful Improvement in Differential Drive Mechanism, and declare the following to be a full, clear, and exact description of the same, such as will enable others skilled in the art to which it pertains to make and use the same, reference being had to the accompanying drawings, which form a part of this specification.

On automobiles, trucks and tractors there are or may be differential driving mechanisms permitting one of two corresponding wheels to move faster than the other when the vehicle supported thereby is making a turn.

The object of the present invention is to produce a simple and novel mechanism for positively driving two aligned shafts as long as the latter are able to rotate at the same speed, and intermittently to apply a driving effort to the more rapidly moving shaft, when one shaft must rotate faster than the other.

The usual types of differentials also permit one of a pair of wheels to spin, when it loses its traction, so that the other wheel does not receive any driving impulses. A further object of the present invention is to produce a simple and novel differential driving mechanism that will exert a driving effort on that wheel that has traction as well as on the wheel without traction, by restricting the spinning movements of the latter wheel to short angular movements alternating with movements during which power is applied to both wheels.

A still further object of the present invention is to produce a novel position drive differential driving mechanism that will exert a driving effort on each of two vehicle wheels during each revolution of the driving element, which shall consist of a few rugged parts simply made and capable of withstanding long rough usage without serious deterioration.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a side view of a differential mechanism arranged in accordance with the present invention, one-half of the housing being broken away to show the interior of the mechanism; Fig. 2 is an elevation of the mechanism, viewing the opposite side from that shown in Fig. 1; Fig. 3 is an axial section taken approximately on line 3—3 of Fig. 1; Fig. 4 is a section taken approximately on line 4—4 of Fig. 3, one of the dogs being omitted and Fig. 5 is a view of the fragment of the mechanism, from the same viewpoint as Fig. 1, the housing being omitted, and the parts being shown in a different position from that in which they appear in Fig. 1.

Referring to the drawings, 1 and 2 represent the adjoining ends of two aligned shafts which, for the sake of convenience, will be referred to as the shafts of a divided vehicle axle provided with wheels at its ends. Surrounding the shaft ends, and loose thereon, is a cylindrical housing 3 to which the last element of a driving mechanism may be attached for the purpose of rotating the same. Within the housing, at opposite ends thereof, are two thick discs 4 and 5 whose external diameter is the same as the internal diameter of the housing. Each disc has a hub 6 extending outwardly through the housing and forming supporting bearings for the latter. The discs are keyed to the respective shaft ends so as to be rotatable with the latter. The combined thickness of the two discs is less than the interior length of the housing, so that the discs are spaced apart from each other when arranged in opposite ends of the housing. Each disc is provided with a series of radial valleys 7 alternating with radial elevations 8, the discs being alike in this respect.

Within the housing between the discs are two dogs 9 and 10, each dog having a segmental inner end 11 that rests loosely on the shaft ends. The body portion 12 of each dog is more or less diamond shape in cross section, a transverse section at any point being substantially the same as a cross section taken at the same distance from the axis of the shaft through the chamber formed by two registering valleys of the discs when the discs are laid against each other. The centers of what might be termed the corrugated portions of the discs are cut away to receive the segmental basis of the dogs, so that when a dog is laid in a valley in one of the discs and the other disc is laid on top of it the dog fills two registering valleys. The angles of the sides of the valleys and elevations are preferably about 90 degrees so that, when one of the discs is rotated relatively to the other, considering only a single dog for the moment, the dog will ride up out of the valley in one of the discs to the top of one of the adjacent elevations; the parts being so proportioned as to constitute a sort of escapement that will permit one disc to be moved relatively to each other step by step, each step having an angular length equal to the distance between the center of one valley to the center of the next adjacent valley.

Each dog is also provided at its outer end with a lug 13 projecting through a slot in the cylindrical wall of the housing, these slots being indicated at 14 and 15.

It is necessary that when one of the dogs lies in a valley of one of the discs the other dog rest on an elevation of that disc. Therefore there must either be an odd number of valleys in each disc, or the openings 14 and 15 be so disposed as to bring about the desired condition. In the arrangement shown, there are five valleys and five elevations on each disc, thus permitting the openings 14 and 15 to be placed diametrically opposite each other and, for the sake of brevity, only this particular arrangement will be described in detail.

The openings 14 and 15 must be long enough in the direction of the axis of rotation to permit the dogs to slide back and forth lengthwise of the shaft, as the dogs move out of one valley into another. The circumferential dimension of each of the openings must be greater than the corresponding dimension of one of the lugs on the dogs, by an amount equal to the distance that the lug must travel while the dog is traveling across an elevation on one of the discs, in order to permit the dog to pass the elevation and begin to descend the valley on the opposite side. It will be seen that the elevations are flattened at the top and that the corners of the dogs that engage with the flattened tops of the elevations are also flattened, as indicated at 16 in Fig. 4.

In Fig. 1 the parts are shown in a position in which the dog 9 lies in one of the valleys of the disc 4. The flattened corner on the opposite side of the top now rests on an elevation on the other disc. The lug 13 on the dog abuts against one of the long edges of the opening 14. It will be seen that if power is applied tending to rotate the housing in such a direction as to carry the dog upwardly, as viewed in Fig. 1, the disc 4 will be positively driven because the dog cannot ride up out of the valley in which it is situated, because it is held against movement lengthwise of the axis of rotation by the elevation on the disc 4. Fig. 2 illustrates the opposite side of the device appearing in Fig. 1, and it will be seen that the dog 10 lies on one of the elevations on the disc 4; the lug 13 on this dog lying against one of the long edges of the opening 15 such that the lug 13 and therefore the dog 10 must turn with the housing. The result is that both of the discs are positively driven so that the two shafts rotate together as though they constituted only a single member.

Assuming that the shaft 2 carries the outer wheel of a vehicle going around a turn, this shaft must turn faster than the shaft 1, with the result that the elevation that is holding the dog 9 in the valley in the disc 4, begins to move ahead of the dog until the cooperating flattened surface on the elevation and the dog pass each other, and the dog is free to begin an entry into the valley immediately behind this particular elevation. The turning effort of the housing on the dog 9 continues to be exerted and therefore, as soon as the dog is no longer positively locked in the valley that it lies in in Fig. 1, it rides up the incline of the elevation immediately in front of it, as shown in Fig. 5, and begins to enter the valley in the disc 5 that is beginning to come opposite it. This shifting movement of the dog continues until the disc 5 has moved ahead one complete step equal to the angular distance between the centers of two adjacent valleys, whereupon the condition shown in Fig. 1 is reversed; the dog being fully entered into a valley in the disc 5 and being held there by an elevation on the disc 4. Then as the shaft 2 continues to travel ahead faster than the shaft 1, the disc 5 carries the dog with it across the flattened top of the elevation on the disc 4 that is holding the dog in the valley. When these flattened engaging surfaces have passed each other, the dog again shifts itself over into a valley in the disc 4.

The operation of the dog 10 is the same as that just described excepting that while one of the discs is carrying the dog 10 along with it the other dog is being held stationary with respect to the other disc. In other words the cycles of operation are precisely the same for the two dogs, but are out of step with each other.

It will thus be seen that during each revolution of the driving housing there will be a series of short periods during which the more rapidly moving shaft may be said to travel free, these periods being those during which the flat faces on the elevations and the dogs are passing each other. At all other times, when the dogs are partly in a valley in one disc and partly in a valley in the other disc both of the discs are driven by the dogs. The angular widths of the flattened portions on the dogs and the elevations are comparatively small, so that both axles will have driving forces applied thereto during the greater portion of each revolution of the housing, when one of the axles must travel faster than the other.

It will also be seen that in the event of one of the wheels at the ends of the two shafts losing its traction, so as to tend to spin, there will again occur the alternate periods of interlocking of the two discs and their release from each other, so that the wheel which does have traction will always receive driving impulses during each revolution of the housing, and the wheel that has lost traction will be deprived of its motive force at intervals during each revolution. In other words, it is impossible for the driving force to be expended solely in spinning one wheel while the other stands idle.

My improved construction therefore provides means for positively driving two aligned shafts as long as they can rotate at the same speed, but permits one shaft to travel ahead of the other as conditions require it without, however, giving up control of either shaft. Furthermore, my improved construction prevents one shaft from rotating rapidly while the other is standing still, under conditions similar to that existing when one of a pair of traction wheels of a vehicle loses its traction while the other is resting on a surface affording good traction; the shaft that offers little resistance to rotation being deprived of power during a series of intervals in each revolution, during which intervals the power is applied wholly to the shaft offering resistance to rotation. These results are accomplished by mechanism consisting of a few strong rugged easily-made parts that will operate efficiently for an almost indefinite length of time.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. A differential mechanism comprising two similar members each having radial valleys alternating with radial elevations on the face directed toward the other member, the sides of the valleys and elevations being sloping and the tops of the elevations being flattened, two dogs each shaped on one side to fit a valley in one member and on the opposite side to fit a valley in the other member, said members being so spaced relatively to each other that when one of the dogs lies in the valley of one it rests against the top of an elevation on the other, the dogs being so disposed that when one lies in a valley in one member the other lies in a valley on the other member, and a driving element for rotating said members, said driving element being interlocked with said dogs so as to permit the dogs to move relative thereto in the axial direction and also to a limited extent in the circumferential direction.

2. A differential mechanism comprising two similar members each having radial valleys alternating with radial elevations on the face directed toward the other member, the sides of the valleys and elevations being sloping, two dogs each shaped on one side to fit a valley in one member and on the opposite side to fit a valley in the other member, said members being so spaced relatively to each other that when one of the dogs lies in the valley of one it rests against the top of an elevation on the other, the dogs being so disposed that when one lies in a valley in one member the other lies in a valley on the other member, and a driving element for rotating said members, said driving element being interlocked with said dogs so as to afford the dogs to move relative thereto in the axial direction and also to a limited extent in the circumferential direction.

3. A differential mechanism comprising two similar discs placed opposite each other and having radial valleys with sloping sides alternating with radial elevations also having sloping sides, two dogs arranged between said discs and each shaped on one side to fit a valley in one of the discs and on the other side to fit a valley in the other disc, the parts being so proportioned and disposed that when either of the dogs lies in the valley of one member it rests against an elevation on the other member and when one dog lies in a valley of the other member, a driving housing surrounding and rotatable about said discs, said housing having openings therein opposite the ends of said dogs, and each dog having a lug projecting into the coresponding opening and sufficiently smaller than such opening to permit the dog to move relatively to the housing in the axial direction and to a limited extent in the circumferential direction.

4. In combination, two shafts arranged end to end two similar elements each fixed to one of the shafts and spaced apart from each other, two dogs located between said elements and engaged with both elements, said elements having radial valleys and elevations provided with sloping sides, and the dogs having working faces inclined to parallel said sloping sides, and a driving member interlocked with said dogs in such a manner that the dogs may move relatively to the driving member a limited distance both angularly and lengthwise of the shaft.

5. In a device of the character described, two shafts arranged end to end, two similar elements fixed to the respective shafts and spaced a short distance apart, each element having radial valleys separated by radial elevations the sides of which are sloping, two dogs each adapted approximately to fit two registering valleys in said elements when the latter are placed in contact with each other, said dogs being arranged between said elements in such positions that when one dog lies in a valley of one element it engages with the top of an elevation on the second element while the other dog lies in a valley in the second element and engages with the top of an elevation in the first element, and a driving member interlocked with the dogs to permit them to move in the direction of the length of the shafts a distance equal to the depth of one of the valleys and to rotate relatively to said member an angular distance sufficient to permit the dogs to slide over the summits of the elevations.

6. In a device of the character described, a driving casing, two similar driven members rotatable in the casing and having radial elevations and valleys on their opposed faces, two dogs loosely disposed in the casing between said members, the body of each dog having a cross section approximately equal to a valley in one member and a valley in the other member at corresponding radial distances from the axis of rotation, said casing having slots therein at such points that when one of the slots registers with a valley in one of said members the other slot registers with an elevation in that member, each dog having a lug projecting into one of said slots, and each slot having an angular length somewhat greater than the corresponding dimension of the lug on one of the dogs.

7. In combination, two similar discs arranged opposite each other and each having radial valleys and elevations with sloping sides on the face directed toward each other, two dogs located between the discs and cooperating with the same to permit the discs to rotate independently of each other during portions of each revolution and to be locked together during other portions of each revolution, and a driving member surrounding said discs and interlocked with said dogs to permit them to move relatively thereto in the axial direction and also, to a limited extent, in the circumferential direction.

In testimony whereof, I sign this specification.

GEORGE I. WELSH.